United States Patent
Fukuda et al.

(10) Patent No.: US 10,794,566 B2
(45) Date of Patent: Oct. 6, 2020

(54) LIGHT EMITTING DEVICE AND SURFACE LIGHT SOURCE DEVICE

(71) Applicant: Enplas Corporation, Saitama (JP)

(72) Inventors: Yasuyuki Fukuda, Saitama (JP); Kakeru Nakamura, Saitama (JP)

(73) Assignee: Enplas Corporation, Saitama (JP)

( * ) Notice: Subject to any disclaimer, the term of this patent is extended or adjusted under 35 U.S.C. 154(b) by 256 days.

(21) Appl. No.: 15/451,720

(22) Filed: Mar. 7, 2017

(65) Prior Publication Data
US 2017/0261176 A1  Sep. 14, 2017

(30) Foreign Application Priority Data
Mar. 9, 2016  (JP) ................. 2016-045925

(51) Int. Cl.
| | | |
|---|---|---|
| G09F 13/04 | (2006.01) | |
| F21V 5/04 | (2006.01) | |
| G02F 1/13357 | (2006.01) | |
| F21V 3/02 | (2006.01) | |
| F21Y 105/16 | (2016.01) | |
| F21Y 115/10 | (2016.01) | |

(52) U.S. Cl.
CPC ................ F21V 5/04 (2013.01); F21V 3/02 (2013.01); G02F 1/133606 (2013.01); *F21Y 2105/16* (2016.08); *F21Y 2115/10* (2016.08); *G02F 1/133603* (2013.01); *G02F 2001/133607* (2013.01)

(58) Field of Classification Search
CPC ..... F21V 3/02; F21V 5/04; F21V 9/00; G02F 1/133606; G02F 2001/133607; G02F 1/133603; F21Y 2105/16; F21Y 2115/10

USPC ........................................................ 362/91.1
See application file for complete search history.

(56) References Cited

U.S. PATENT DOCUMENTS

| | | | |
|---|---|---|---|
| 2006/0066218 A1* | 3/2006 | Yamaguchi ........ | G02B 19/0061 313/498 |
| 2008/0297020 A1 | 12/2008 | Wanninger et al. | |
| 2009/0052192 A1* | 2/2009 | Kokubo ................ | F21V 5/048 362/311.09 |
| 2011/0114979 A1* | 5/2011 | Jang ...................... | H01L 33/486 257/98 |

(Continued)

FOREIGN PATENT DOCUMENTS

JP    2009-510731 A    3/2009

*Primary Examiner* — William J Carter
*Assistant Examiner* — Omar Rojas Cadima
(74) *Attorney, Agent, or Firm* — Brundidge & Stanger, P.C.

(57) ABSTRACT

A light emitting device includes a light emitting element and a light flux controlling member. The light flux controlling member includes an incidence surface and an emission surface, and is disposed such that, in a cross section of the light emitting device, light emitted at least $\theta_1=81°$ from a light emission center of the light emitting element is incident on the rear surface of the light flux controlling member, and the emission surface is formed such that, in the cross section of the light emitting device, a curve of a graph with an abscissa of $\theta_1$ and an ordinate of $\theta_2$ includes an inflection point, wherein $\theta_2$ is an angle between a line orthogonal to the optical axis and a tangent to the emission surface at a point P, the point P being an arrival point of light emitted from the light emission center at angle $\theta_1$.

16 Claims, 14 Drawing Sheets

(56) References Cited

U.S. PATENT DOCUMENTS

| | | | |
|---|---|---|---|
| 2013/0094218 A1* | 4/2013 | Wang | F21V 5/04 362/311.02 |
| 2016/0138774 A1* | 5/2016 | Joo | H01L 33/58 362/84 |

* cited by examiner

LIGHT EMITTING DEVICE AND SURFACE LIGHT SOURCE DEVICE

CROSS REFERENCE TO RELATED APPLICATIONS

This application is entitled to and claims the benefit of Japanese Patent Application No. 2016-045925, filed on Mar. 9, 2016, the disclosure of which including the specification, drawings and abstract is incorporated herein by reference in its entirety.

TECHNICAL FIELD

The present invention relates to a light emitting device and a surface light source device.

BACKGROUND ART

Some transmission type image display apparatuses such as liquid crystal display apparatuses use a direct surface light source device as a backlight. In recent years, direct surface light source devices having a plurality of light emitting elements as the light source have been used.

For example, a direct surface light source device includes a plurality of light emitting elements, a plurality of light flux controlling members (lens) and a light diffusion member. Each of the light emitting elements is, for example, a light emitting diode (LED) such as a white light emitting diode. The light emitting elements are disposed in a matrix on the bottom surface in the surface light source device. The light flux controlling member that spreads the light of the light emitting element in the surface direction of a substrate is disposed over each light emitting element. The light emitted from the light flux controlling member is diffused by the light diffusion member so as to illuminate a member to be illuminated (for example, a liquid crystal panel) in a planar fashion.

For the purpose of suppressing luminance unevenness due to a dark region between one light emitting element and another light emitting element, a conventional surface light source device is designed to widely spread, in a direction (horizontal direction) away from the optical axis of the light emitting element, the light emitted from a light emitting element through a light flux controlling member.

FIG. 1 is a sectional view illustrating a configuration of a part of a conventional surface light source device. As illustrated in FIG. 1, conventional surface light source device 1 includes light emitting element 2, first light flux controlling member 3, and second light flux controlling member 4 (see, for example, PTL 1). First light flux controlling member 3 includes incidence surface 3A on which light emitted from light emitting element 2 is incident, and emission surface 3B that emits light incident on incidence surface 3A to the outside. Second light flux controlling member 4 includes incidence surface 4A on which light emitted from first light flux controlling member 3 is incident, and emission surface 4B that emits light incident on incidence surface 4A to the outside. Incidence surface 4A of second light flux controlling member 4 is a surface recessed with respect to light emitting element 2, which is opposite to the light emitting surface of light emitting element 2. The rear surface of second light flux controlling member 4 is in contact with casing body 5 that holds light emitting element 2.

Light emitted from light emitting element 2 is incident on first light flux controlling member 3, and is refracted and emitted in a direction away from optical axis LA (dotted line). The light emitted from first light flux controlling member 3 is incident on second light flux controlling member 4, and refracted and emitted in a direction away from optical axis LA (dotted line). With this configuration, light from light emitting element 2 can be widely spread in a direction away from optical axis LA.

In recent years, surface light source devices having a local dimming function are increasingly being used. The local dimming function is a technique in which the display screen of a display is sectioned into multiple parts, and the brightness of the backlight is adjusted in accordance with the brightness of the images of respective parts. That is, to ensure the local dimming function, it is necessary to control the light emission level for each light emitting element of a surface light source device. Accordingly, light emitted from the light emitting element is required to be spread while preventing interference between light emitted from one light emitting element and light emitted from an adjacent light emitting element. That is, light emitted from a light emitting element through a light flux controlling member is required to be easily and moderately spread in a region around optical axis LA of the light emitting element, without being excessively spread in a direction away from optical axis LA (horizontal direction).

CITATION LIST

Patent Literature

PTL 1
Japanese Unexamined Patent Application Publication (Translation of PCT Application) No. 2009-510731

SUMMARY OF INVENTION

Technical Problem

However, in conventional surface light source device 1, light emitted from light emitting element 2 through second light flux controlling member 4 is easily spread in a direction away from optical axis LA. Therefore, interference between light emitted from one light emitting element and light emitted from another adjacent light emitting element may occur, and contrast may be reduced. Such a surface light source device is not suitable for a surface light source device of a display having a local dimming function, for example.

In view of the foregoing, an object of the present invention is to provide a light emitting device in which emission light is easily and moderately spread in a region around the optical axis of a light emitting element without being excessively spread in a direction away from the optical axis.

In addition, another object of the present invention is to provide a surface light source device including the light emitting device.

Solution to Problem

A light emitting device according to the embodiment of the present invention includes: a light emitting element; and a light flux controlling member configured to control a distribution of light emitted from the light emitting element. The light flux controlling member includes: an incidence surface composed of an internal surface of a recess formed on a rear side of the light flux controlling member to intersect a central axis of the light flux controlling member, the incidence surface being configured to allow incidence of the light emitted from the light emitting element, and an emission surface formed on a front side of the light flux controlling member to intersect the central axis, and configured to emit light incident on the incidence surface to outside of the light flux controlling member, the light flux controlling member is disposed such that, in a cross section of the light emitting device including an optical axis of the light emitting element, light emitted at at least $\theta1=81°$ from the light emission center of the light emitting element is incident on the rear surface of the light flux controlling member, wherein $\theta1$ is an angle of the light emitted from the light emission center as a base point with respect to the optical axis, the central axis of the light flux controlling member and the optical axis coinciding each other, and the emission surface is formed such that, in the cross section of the light emitting device including the optical axis of the light emitting element, a curve of a graph with an abscissa of $\theta1$ and an ordinate of $\theta2$ includes an inflection point, wherein $\theta2$ is an angle between a line orthogonal to the optical axis and a tangent to the emission surface at a point P, the point P being an arrival point on the emission surface of light emitted from the light emission center of the light emitting element at angle $\theta1$ with respect to the optical axis.

A surface light source device according to the embodiment of the present invention includes: the light emitting device; and a light diffusion member configured to allow light from the light emitting device to pass therethrough while diffusing the light.

Advantageous Effects of Invention

In the light emitting device according to the embodiment of the present invention, emission light is easily and moderately spread in a region around an optical axis of a light emitting element without being excessively spread in a direction away from the optical axis. In addition, since the surface light source device according to the embodiment of the present invention includes the light emitting device, it is possible to easily adjust the brightness section by section.

DESCRIPTION OF EMBODIMENTS

In the following, a light flux controlling member, a light emitting device, a surface light source device and a display device of embodiments of the present invention are described in detail with reference to the accompanying drawings. In the following description, as a typical example of the surface light source device according to the embodiments of the present invention, a surface light source device suitable for a backlight of a liquid crystal display apparatus will be described. When used with a member (for example, a liquid crystal panel) configured to be irradiated with light from the surface light source device, the surface light source device can be used as a display apparatus.

[Configuration of Surface Light Source Device and Light Emitting Device]

Figure 1:
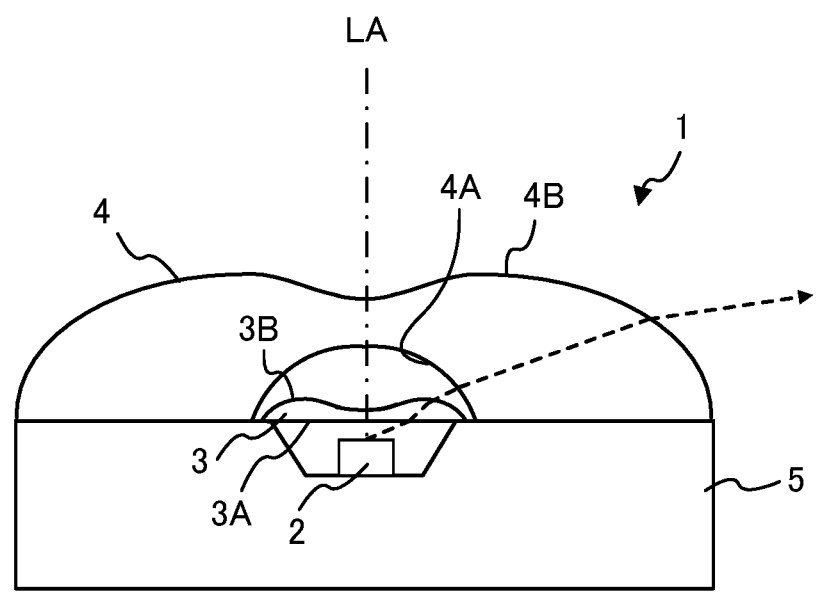
FIG. 1 illustrates a configuration of a part of a conventional surface light source device.
Figure 2A:
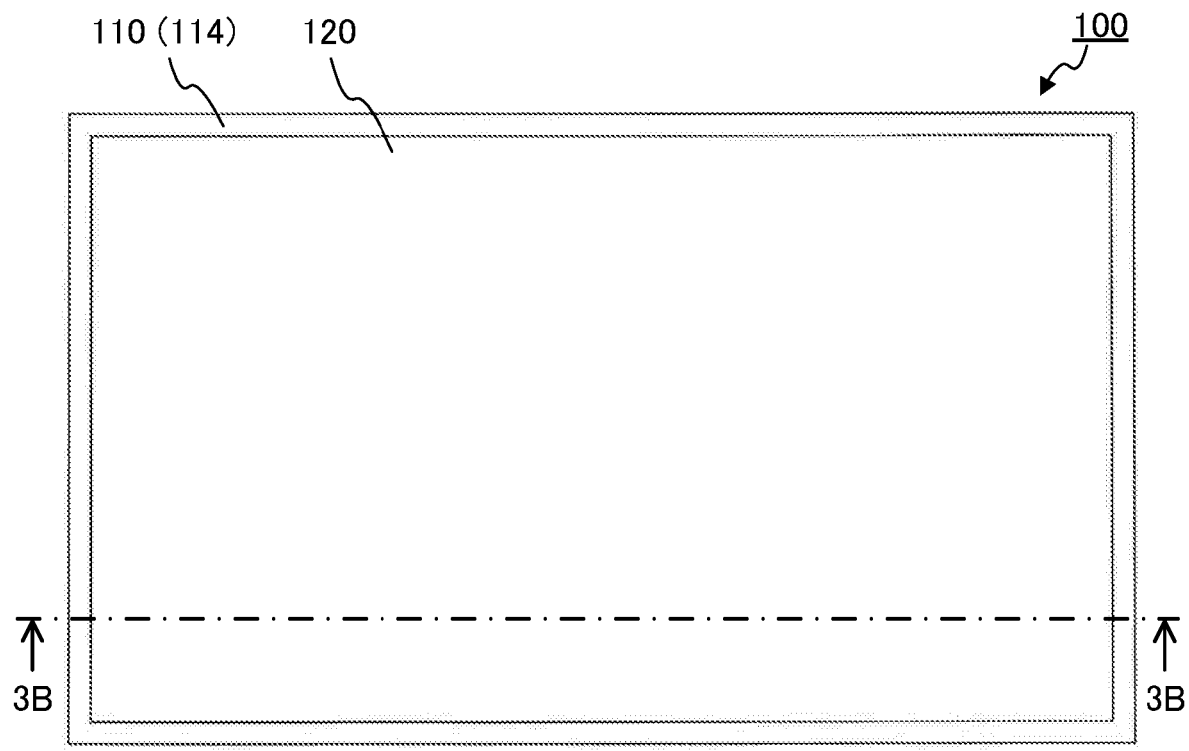
FIG. 2A and FIG. 2B illustrate a configuration of a surface light source device according to an embodiment of the present invention.
Figure 2B:
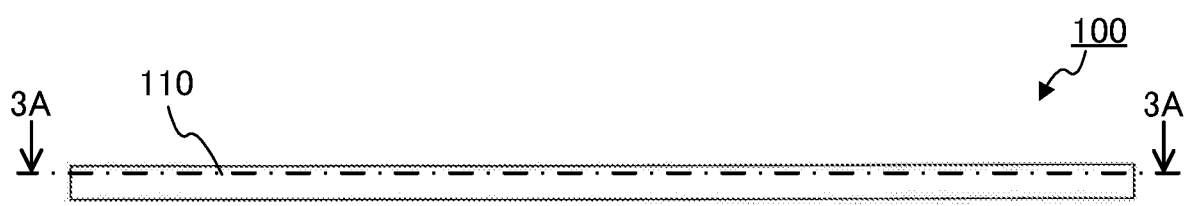
Figure 3A:
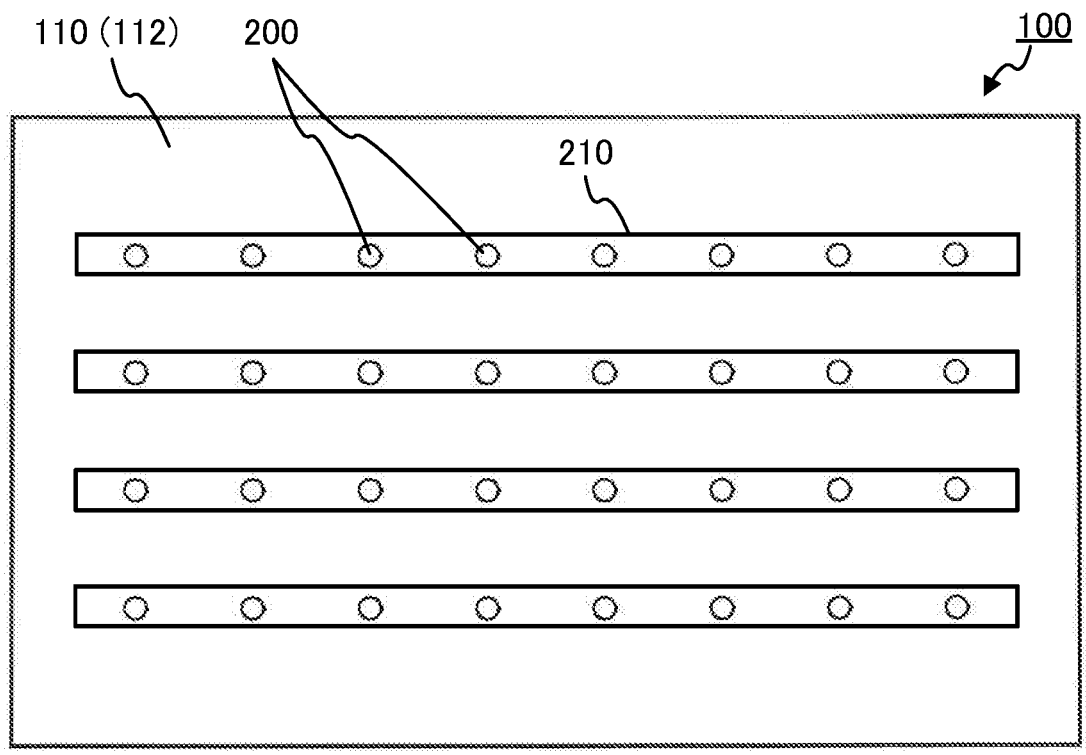
FIG. 3A and FIG. 3B are sectional views illustrating the configuration of the surface light source device according to the embodiment of the present invention.
Figure 3B:
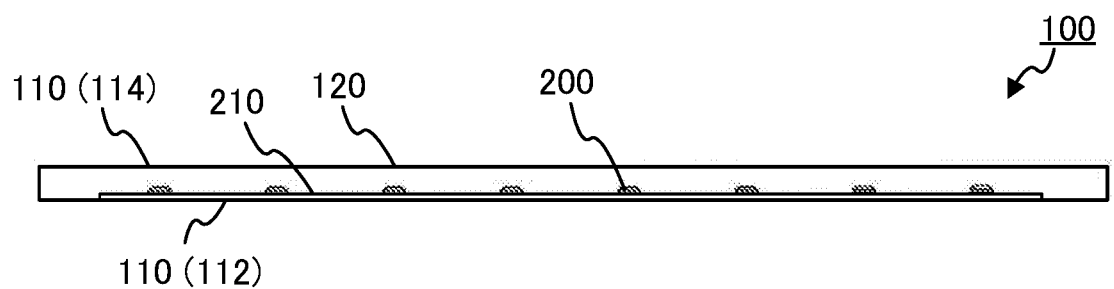
Figure 4:
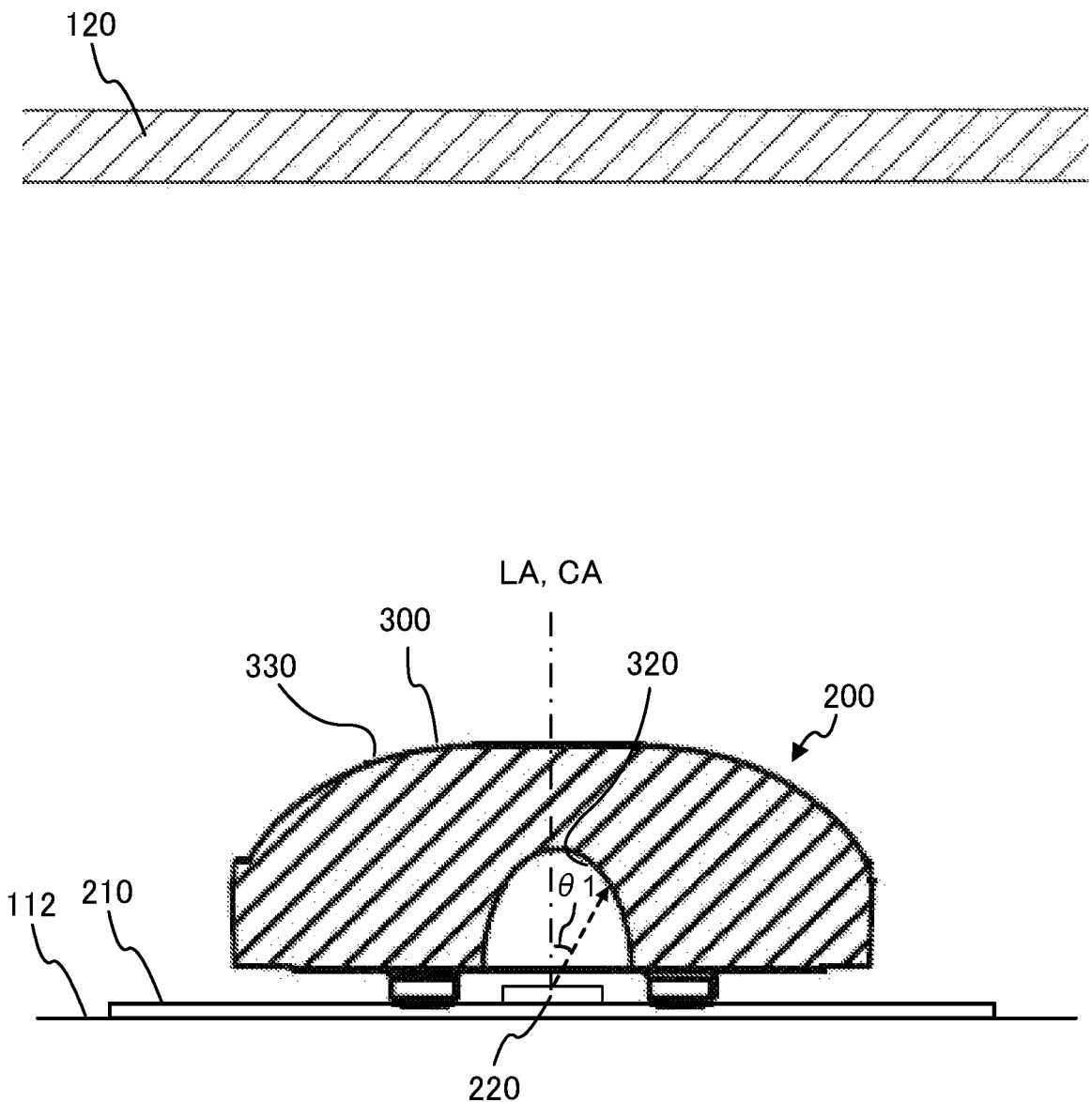
FIG. 4 is a partially enlarged sectional view of FIG. 3B.

FIG. 2A to FIG. 4 illustrate a configuration of the surface light source device according to the embodiment of the present invention. FIG. 2A is a plan view, and FIG. 2B is a front view. FIG. 3A is a sectional view taken along line 3A-3A of FIG. 2B, and FIG. 3B is a sectional view taken along line 3B-3B of FIG. 2A. FIG. 4 is an enlarged sectional view illustrating a part of FIG. 3B.

As illustrated in FIG. 3 and FIG. 4, surface light source device 100 according to the embodiment of the present invention includes casing 110, a plurality of light emitting devices 200 and light diffusion member 120. Casing 110 includes bottom plate 112 and top plate 114. The internal surface of bottom plate 112 of casing 110 functions as a diffusive reflection surface. A plurality of substrates 210 are disposed on bottom plate 112 of casing 110, and a plurality of light emitting devices 200 are disposed on each substrate 210. In addition, top plate 114 of casing 110 is provided with an opening. Light diffusion member 120 is disposed to cover the opening, and functions as a light emitting surface. The light emitting surface may have a size of, for example, approximately 400 mm×approximately 700 mm.

As illustrated in FIG. 4, each of light emitting devices 200 includes light emitting element 220 and light flux controlling member 300.

Light emitting element 220 is a light source of surface light source device 100, and is mounted on substrate 210. Light emitting element 220 is a light emitting diode (LED) such as a white light emitting diode, for example.

Light flux controlling member 300 is fixed on substrate 210. Light flux controlling member 300 controls a distribution of light emitted from light emitting element 220, and spreads the light travelling direction in the surface direction of surface light source device 100. Light flux controlling member 300 is disposed in such a manner that its central axis CA coincides with optical axis LA of light emitting element 220.

Surface light source device 100 according to the embodiment of the present invention is mainly characterized by the installation position of light flux controlling member 300 with respect to light emitting element 220 and the configuration of light flux controlling member 300. In view of this, first, the installation position of light flux controlling member 300 with respect to light emitting element 220 is described below in more detail.

Figure 5:
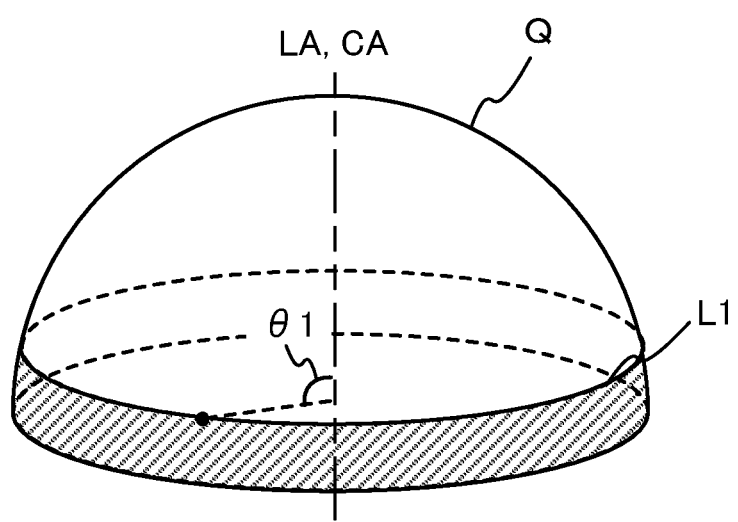
FIG. 5 is a conceptual drawing illustrating a proportion of light which is incident on the rear surface of a light flux controlling member with respect to light emitted from the light emitting element.

FIG. 5 is a conceptual drawing illustrating the proportion of light which is incident on rear surface 340 (see FIG. 6D) of light flux controlling member 300 in the light emitted from light emitting element 220.

Virtual hemisphere Q is a hemisphere whose bottom surface is a plane orthogonal to optical axis LA and includes the light emission center of light emitting element 220. Further, light flux controlling member 300 is disposed over light emitting element 220 such that light emitted from light emitting element 220 which passes through upper limit line L1 of a region (solid portion) of at least 15% from the bottom surface of the spherical cap surface area of virtual hemisphere Q is incident on rear surface 340 of light flux controlling member 300 described later (Configuration 1, see FIG. 4 and FIG. 5).

The "light which passes through upper limit line L1 of a region (solid portion) of at least 15% from the bottom surface of the spherical cap surface area of virtual hemisphere Q" corresponds to light emitted from the light emission center of light emitting element 220 at an angle of $\theta 1=81°$ with respect to optical axis LA in FIG. 4. That is, light flux controlling member 300 is disposed such that at least light emitted from the light emission center of light emitting element 220 at an angle of $\theta 1=81°$ with respect to optical axis LA (preferably $\theta 1 \geq 77°$) is incident on rear surface 340 of light flux controlling member 300 described later. The angle $\theta 1$ is an angle with respect to optical axis LA with the light emission center of light emitting element 220 as the base point.

That is, in light emitting device 200 according to the embodiment of the present invention, the proportion of light which is incident on rear surface 340 of light flux controlling member 300 described later in the light emitted from light emitting element 220 is large in comparison with the conventional light emitting device. The light which is incident on rear surface 340 of light flux controlling member 300 described later easily rises in light flux controlling member 300, and therefore the light emitted from emission surface 330 described later is not easily spread in a direction away from optical axis LA. The amount of the light which is incident on rear surface 340 of light flux controlling member 300 can be increased by increasing the height of rear surface 340 of light flux controlling member 300 from light emitting element 220, for example.

It is to be noted that each of incidence surface 320 and emission surface 330 of light flux controlling member 300 described later is rotationally symmetrical (circularly symmetrical), and the rotational axes thereof coincide with each other. The rotational axes of incidence surface 320 and emission surface 330 is referred to as "central axis CA of light flux controlling member." In addition, "optical axis LA of light emitting element" refers to a central light beam of a stereoscopic light flux from light emitting element 220.

Light flux controlling member 300 can be formed by integral molding. The material of light flux controlling member 300 is not limited as long as light of a desired wavelength can pass therethrough. For example, the material of light flux controlling member 100 is a light transmissive resin such as polymethylmethacrylate (PMMA), polycarbonate (PC), epoxy resin (EP); and silicone resin, or glass.

Details of light flux controlling member 300 will be described later.

Light diffusion member 120 is a plate-shaped member (diffusion plate) having a light diffusing property, and allows the light emitted from light emitting device 200 to pass therethrough while diffusing the light. Normally, the size of light diffusion member 120 is substantially the same as that of the member to be irradiated such as a liquid crystal panel. For example, light diffusion member 120 is formed of a light transmissive resin such as polymethylmethacrylate (PMMA), polycarbonate (PC), polystyrene (PS), and styrene methyl methacrylate copolymerization resin (MS). For the purpose of providing a light diffusing property, minute irregularities are formed on the surface of light diffusion member 120, or diffusing members such as beads are dispersed in light diffusion member 120.

In surface light source device 100 according to the embodiment of the present invention, light emitted from each light emitting element 220 is spread by light flux controlling member 300 in a region around optical axis LA, but not excessively spread in a direction away from optical axis LA. Accordingly, light emitted from one light emitting element 220 is incident on light diffusion member 120 in the state where interference by light emitted from another light emitting element 220 adjacent to the one light emitting element 220 is minimized. The light incident on light diffusion member 120 is further diffused by light diffusion member 120. In this manner, surface light source device 100 according to the embodiment of the present invention can separately illuminate a planar member to be illuminated (for example, a liquid crystal panel) section by section.

[Configuration of Light Flux Controlling Member]

Figure 6A:
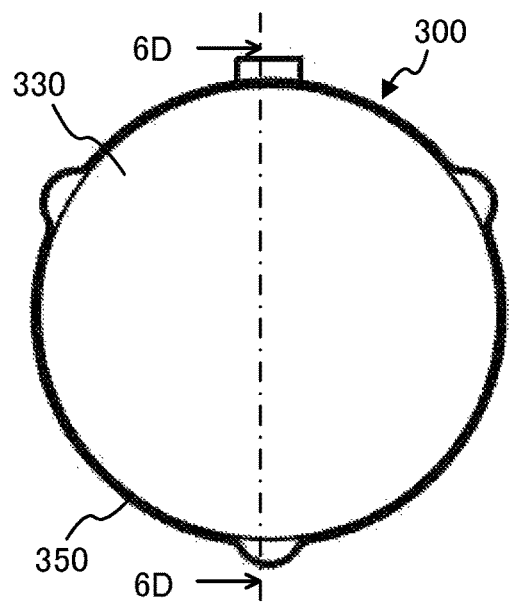
FIG. 6A to FIG. 6D illustrate a configuration of a light flux controlling member of the light emitting device according to the embodiment of the present invention.
Figure 6B:
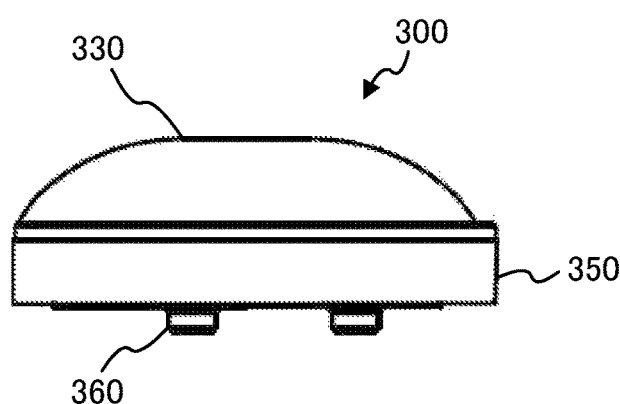
Figure 6C:
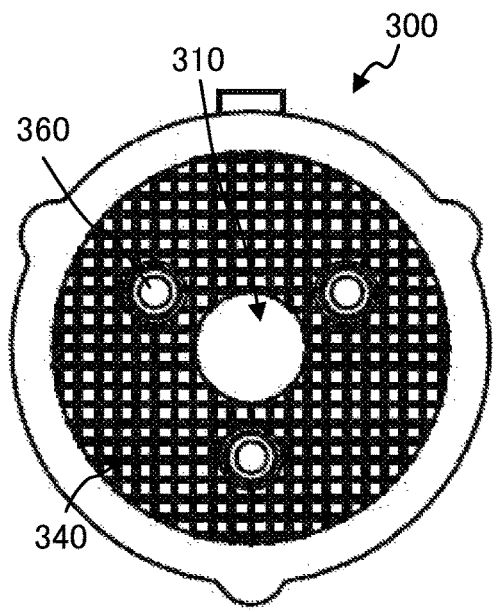
Figure 6D:
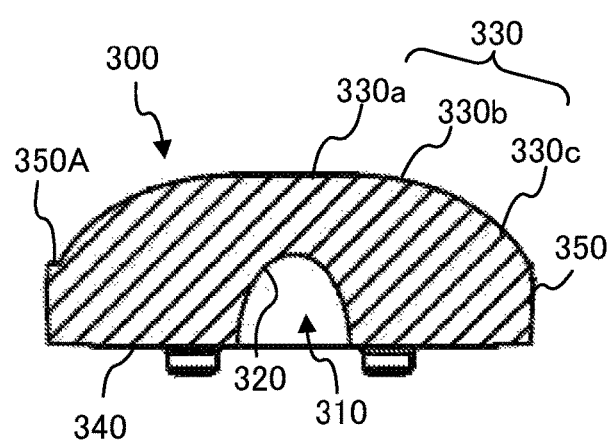

FIG. 6A to FIG. 6D illustrate a configuration of light flux controlling member 300 according to the embodiment of the present invention. FIG. 6A is a plan view, FIG. 6B is a front view, FIG. 6C is a bottom view, and FIG. 6D is a sectional view taken along line 6D-6D of FIG. 6A.

As illustrated in FIG. 6D, light flux controlling member 300 includes recess 310 forming incidence surface 320, emission surface 330, rear surface 340, flange part 350, and leg part 360.

Recess 310 is formed at a center portion on the rear side (light emitting element 220 side) of light flux controlling member 300. The internal surface of recess 310 functions as incidence surface 320. Incidence surface 320 allows most of light emitted from light emitting element 220 to enter light flux controlling member 300 while controlling the travelling direction of the light. Incidence surface 320 intersects central axis CA of light flux controlling member 300, and is rotationally symmetrical (circularly symmetrical) about central axis CA. From the viewpoint of preventing light from being excessively spread in a direction away from optical axis LA, the inclination of incidence surface 320 around the vertex thereof (a region around optical axis LA) is preferably moderate in comparison with the inclination of the incidence surface around the vertex of conventional light flux controlling members (Configuration 2).

Emission surface 330 is formed on the front side (light diffusion member 120 side) of light flux controlling member 300 to protrude from flange part 350. Emission surface 330 emits the light having entered light flux controlling member 300 to the outside while controlling the travelling direction of the light. Emission surface 330 intersects central axis CA, and is rotationally symmetrical (circularly symmetrical) about central axis CA.

Emission surface 330 includes first emission surface 330a disposed at a position to intersect optical axis LA (or central axis CA), second emission surface 330b continuously disposed at the periphery of first emission surface 330a, and third emission surface 330c that connects second emission surface 330b and flange part 350 (see FIG. 6D). First emission surface 330a is a curved surface recessed with respect to the front side. Second emission surface 330b is a smooth curved surface located at the periphery of first emission surface 330a and protruding toward the front side. Second emission surface 330b has an annular protruding shape. Third emission surface 330c is a curved surface located at the periphery of second emission surface 330b. In the cross section of FIG. 6D, third emission surface 330c may have a linear shape, or a curved shape. In addition, in the case where a region to be irradiated with light emitted from one light emitting device 200 is small, the effect of spreading light at first emission surface 330a is not required to be strong, and therefore first emission surface 330a may not be a curved surface recessed with respect to the front side, and may be a plane orthogonal to optical axis LA, or a convex curved surface having a curvature radius greater than that of second emission surface 330b.

Figure 7:
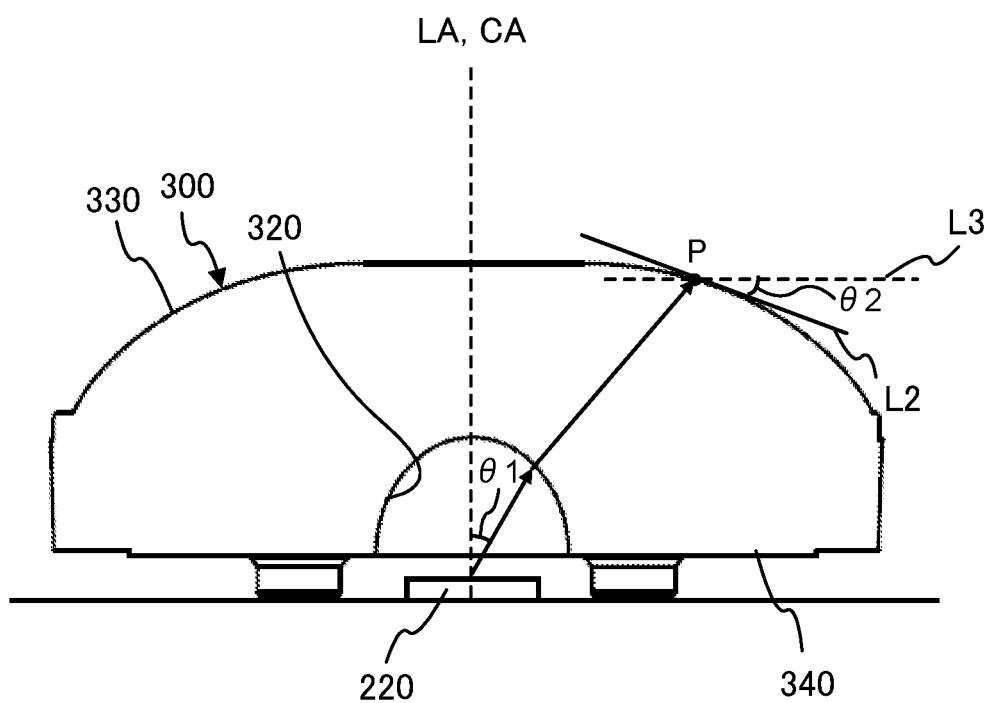
FIG. 7 is an explanatory diagram of a definition of $\theta2$ in a cross section including an optical axis of the light emitting device according to the embodiment of the present invention.

The inclination of emission surface 330 is moderate in comparison with the conventional emission surface. FIG. 7 is an explanatory diagram of a definition of θ2 in a cross section including optical axis LA of the light emitting device according to the embodiment of the present invention.

θ2 indicates the inclination of emission surface 330, and is a smaller angle between tangent L2 and line L3 (see FIG. 7). Tangent L2 is a tangent to emission surface 330 at arrival point P where light which is emitted from the light emission center of light emitting element 220 at angle θ1 with respect to optical axis LA and enters light flux controlling member 300 on incidence surface 320 reaches light emission surface 330. Line L3 is a line which passes through point P and is orthogonal to optical axis LA. In the present embodiment, regarding the light emitted from the light emission center of light emitting element 220, light whose θ1 falls within a range of 0° to 75° is incident on incidence surface 320. Inclination θ2 of the emission surface at arrival point P where the light having passed through incidence surface 320 reaches light emission surface 330 falls within a range of approximately −40° to 5° in the present embodiment. In FIG. 7, θ2 has a negative value when the intersection of tangent L2 to emission surface 330 and optical axis LA at point P is located above line L3 (the line which passes through point P and is orthogonal to optical axis LA), whereas θ2 has a positive value when the intersection of tangent L2 to emission surface 330 and optical axis LA at point P is located below line L3. Emission surface 330 is formed such that a curve in a graph with the abscissa of θ1 and the ordinate of θ2 has an inflection point (for example, point X of FIG. 10A) (Configuration 3, see FIG. 10A).

The inflection point is a point where a convex curve is changed to a concave curve, or a point where a concave curve is changed to a convex curve in a curved line including the convex curve and the concave curve. The inflection point can be obtained as, when a change of an average rate of change (curve inclination) is calculated by second-order differentiation of a curve, a point where the average rate of change (curve inclination) is changed from increase to decrease, or a point where the average rate of change (curve inclination) is changed from decrease to increase.

Figure 10A:
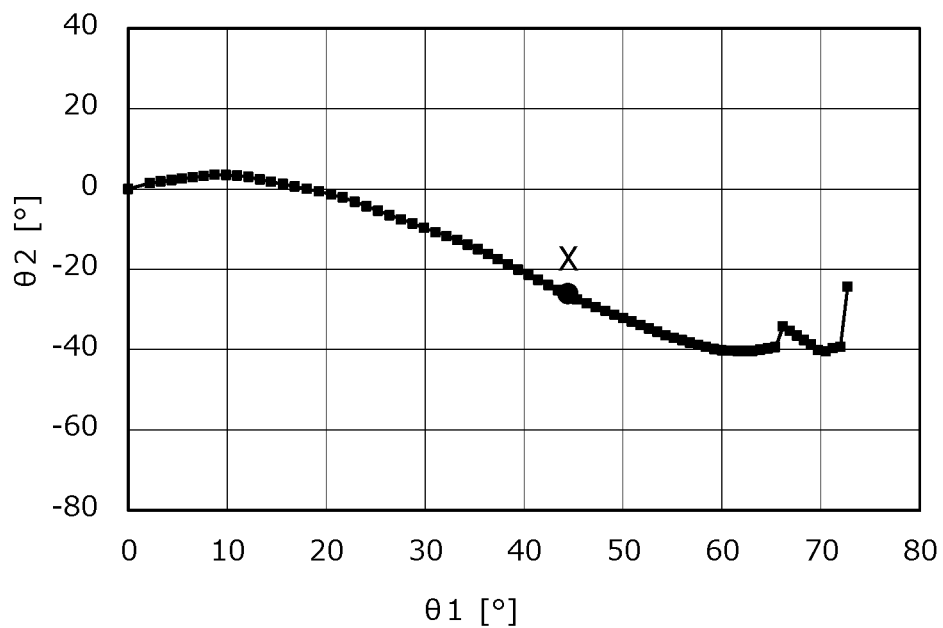
FIG. 10A and FIG. 10B show simulation results of a relationship between $\theta1$ and $\theta2$ in the light emitting device according to the embodiment and the light emitting device for comparison.

In FIG. 10A described later, θ2 at θ1=0° corresponds to θ2 at the center of first emission surface 330a, and θ2 around θ1=20° corresponds to θ2 at the highest point where the height of second emission surface 330b from substrate 210 is maximized (see FIG. 6D). When θ1 is equal to or greater than approximately 44°, the rate of change of θ2 gradually decreases as θ1 increases. That is, from a region around the highest point of second emission surface 330b toward the outer edge of emission surface 330 (third emission surface 330c), the rate of change of the inclination of emission surface 330 gradually decreases. With this configuration, the light arriving at emission surface 330 which is emitted from a region around optical axis LA is moderately spread, whereas the light arriving at emission surface 330 which is emitted from a position separated from optical axis LA is not easily spread.

Rear surface 340 is a plane formed on the rear side of light flux controlling member 300 and extended in a radial direction from the opening edge part of recess 310. In FIG. 6C, rear surface 340 has a prism shape.

Flange part 350 is located between the outer periphery part of emission surface 330 and the outer periphery part of rear surface 340 of light flux controlling member 300, and is protruded outward with respect to central axis CA. Flange part 350 has a substantially annular shape. Flange part 350 is not an essential component; however, by providing flange part 350, the ease of the handling and alignment of light flux controlling member 300 is increased. The thickness of flange part 350 is determined in consideration of a desired dimension of emission surface 330, workability of flange part 350 and the like.

Preferably, at least one of incidence surface 320, emission surface 330 and flange part 350 is a rough surface (Configuration 4). When the surfaces are rough surfaces, the light incident on the surfaces is scattered in a surrounding region thereof, and consequently the quantity of the light spread in a direction away from optical axis LA can be reduced. Preferably, the surface roughness Ra (JIS B 0601; 2001) of the rough surface is 0.05 to 1.0 μm, more preferably 0.1 to 0.3 μm. In addition, preferably, surface roughness Ra of flange part 350 is greater than surface roughness Ra of incidence surface 320 and emission surface 330. The reason for this is that, by setting surface roughness Ra of flange part 350 to a large value, the light emitted from flange part 350 is easily scattered, but not easily spread in a direction away from optical axis LA. Preferably, surface roughness Ra of flange part 350 is 0.1 to 0.5 μm. Surface roughness Ra of the rough surface can be measured with a surface roughness measuring apparatus.

When flange part 350 is a rough surface, upper end portion 350A of flange part 350 is preferably located above the vertex of incidence surface 320 (see FIG. 6D). When upper end portion 350A of flange part 350 is located above the vertex of incidence surface 320, the area of the rough surface of flange part 350 can be increased, and consequently the scattering effect can be further increased. Thus, the quantity of the light spread in a direction away from optical axis LA can be further reduced. In comparison with the case where emission surface 330 is extended to the region of flange part 350 and the extended portion of emission surface 330 is roughened, greater ease of manufacturing is achieved when flange part 350 is formed separately from emission surface 330 and the surface of flange part 350 is roughened.

As described above, to control light emitted from light emitting device 200 such that the light is easily spread in a region around optical axis LA but not easily spread at a position remote from optical axis LA, it is preferable to meet at least the following points 1) and 2). Specifically, 1) the light flux controlling member is disposed such that at least light emitted from light emitting element 220 at $\theta1=81°$ is incident on the rear surface of light flux controlling member 300 described later (Configuration 1); and 2) emission surface 330 is formed to have an inflection point of a curve in a graph with the abscissa of $\theta1$ and the ordinate of $\theta2$ (Configuration 3). It is further preferable to meet at least one of the following points 3) and 4). Specifically, 3) at least one of incidence surface 320, emission surface 330 and flange part 350 is a rough surface (Configuration 4); and 4) the inclination of a region around the vertex of incidence surface 320 (a region around optical axis LA) is moderate in comparison with the conventional configurations (Configuration 2).

A plurality of leg parts 360, which are optionally formed, are substantially columnar shaped members protruding from the rear side of light flux controlling member 300. Leg parts 360 support light flux controlling member 300 at appropriate position with respect to light emitting element 220 (see FIG. 6B and FIG. 6C).

Figure 8:
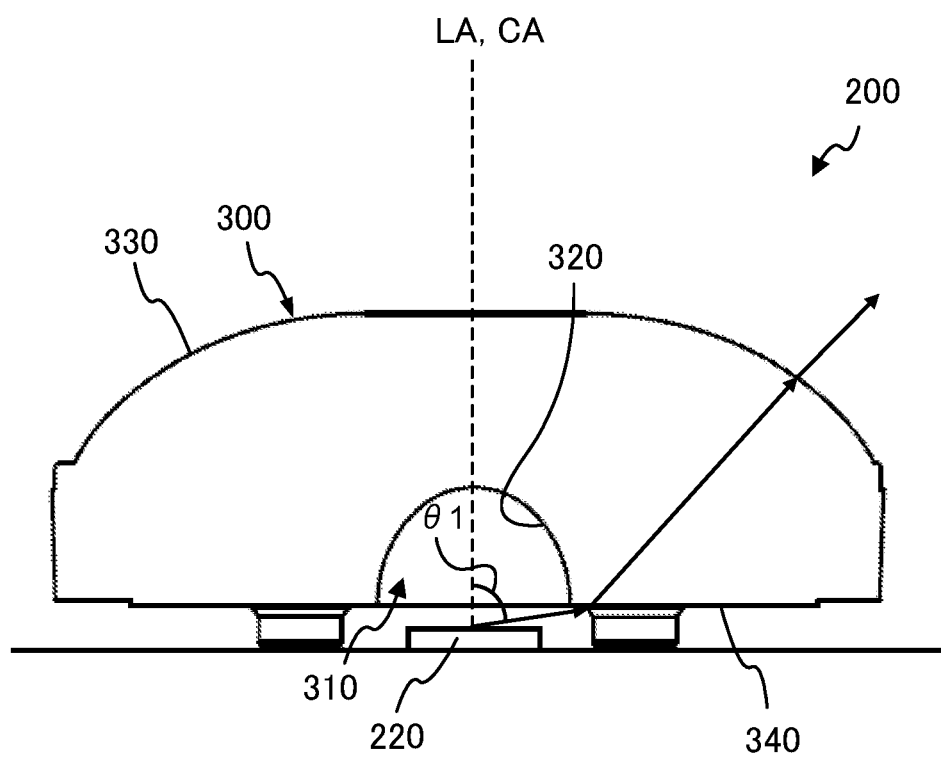
FIG. 8 illustrates light paths of a light emitting device using the light flux controlling member illustrated in FIG. 6A to FIG. 6D.
Figure 9:
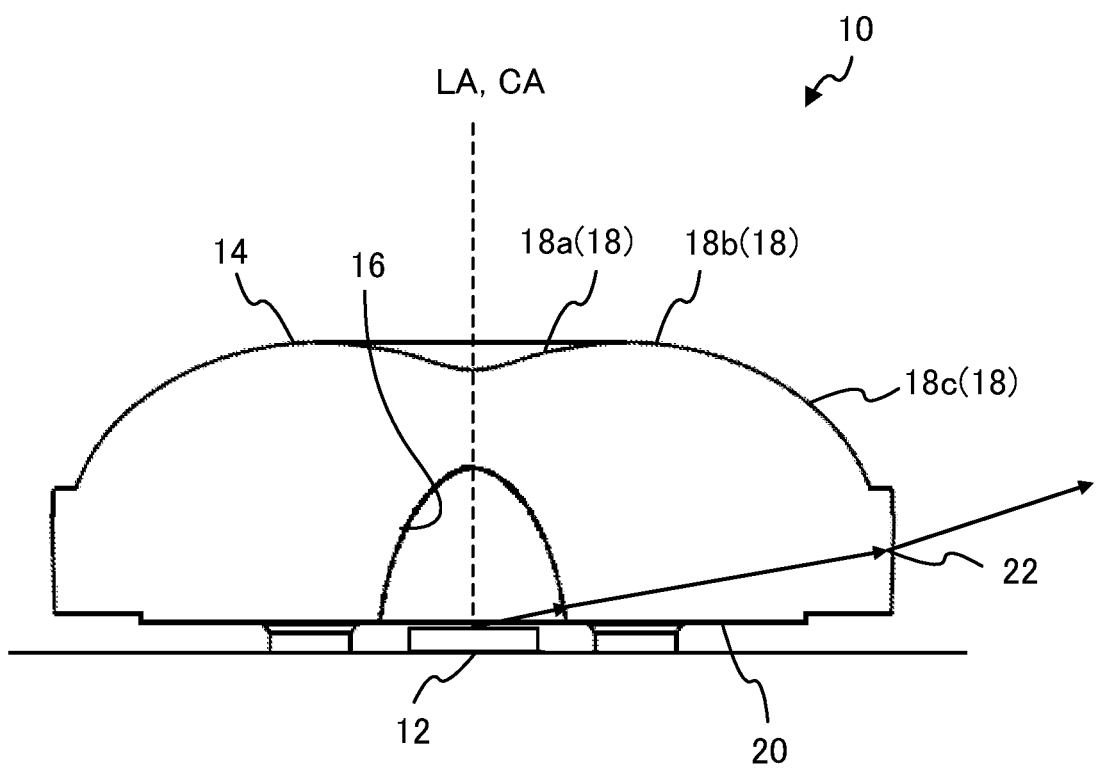
FIG. 9 illustrates light paths of a light emitting device using a light flux controlling member for comparison.

The operation of the light flux controlling member according to the present embodiment is described by comparison between FIG. 8 and FIG. 9. FIG. 8 illustrates light paths of the light flux controlling member illustrated in FIG. 6, and FIG. 9 illustrates light paths of a light flux controlling member for comparison. It is to be noted that, in FIG. 8 and FIG. 9, light is emitted from the light emission center of the light emitting element at the same angle to optical axis LA.

In conventional light emitting device 10, the height of rear surface 20 of light flux controlling member 14 from light emitting element 12 is small, and light emitted at $\theta1=81°$ is incident on incidence surface 16 without being incident on rear surface 20 of light flux controlling member 14. Accordingly, the proportion of light which is incident on rear surface 20 of light flux controlling member 14 is small. In addition, light incident on incidence surface 16 enters flange part 22 through light flux controlling member 14, and is emitted while being spread in a direction away from optical axis LA (horizontal direction) (see FIG. 9). Further, emission surface 18 of light flux controlling member 14 does not include an inflection point of a curve in a graph with the abscissa of $\theta1$ and the ordinate of $\theta2$ (see FIG. 10B described later). That is, the rate of change of the inclination of emission surface 18 (in particular, a portion from the highest point of second emission surface 18b to third emission surface 18c) gradually increases. Accordingly, light incident on an upper part of incidence surface 16 is easily emitted to spread in a direction away from optical axis LA at emission surface 18.

In contrast, in light emitting device 200 according to the present embodiment, the height of the rear surface of light flux controlling member 300 from light emitting element 220 is large, and light emitted at $\theta1=81°$ is incident on rear surface 340 of light flux controlling member 300. Accordingly, in the light emitted from light emitting element 220, the proportion of the light which is incident on rear surface 340 of light flux controlling member 300 is large in comparison with the conventional light emitting device. The light incident on rear surface 340 of light flux controlling member 300 is refracted and raised in light flux controlling member 300 (see FIG. 8). Further, in light emitting device 200 according to the present embodiment, emission surface 330 of light flux controlling member 300 is formed such that a curve in a graph with the abscissa of $\theta1$ and the ordinate of $\theta2$ includes an inflection point (see FIG. 10A). That is, the rate of change of the inclination of emission surface 330 (in particular, a portion from the highest point of second emission surface 330b to third emission surface 330c in FIG. 6D) gradually decreases. Accordingly, the light which is incident on incidence surface 320 and is emitted from a region around optical axis LA of emission surface 330 is moderately spread, and the light which is incident on incidence surface 320 and is emitted from a position separated from optical axis LA is not easily spread. In this manner, by forming emission surface 330 such that a curve in a graph with the abscissa of $\theta1$ and the ordinate of $\theta2$ includes an inflection point, the light which enters light flux controlling member 300 on incidence surface 320 can be prevented from being excessively spread at the time of emission from emission surface 330.

[Simulation]
(1. Simulation of Shape of Emission Surface of Light Flux Controlling Member)

Light emitting device A according to Embodiment 1 has a configuration in which, in light emitting device 200 of FIG. 8, incidence surface 320 and emission surface 330 are formed as rough surfaces having a surface roughness Ra of 0.1 µm, the surface of flange part 350 is formed as a rough surface having a surface roughness Ra of 0.4 µm, and the height of rear surface 340 of light flux controlling member 300 from the light emission center of light emitting element 220 (the gap between light flux controlling member 300 and light emitting element 220) is set to 0.4 mm. Further, for comparison, light emitting device D for comparison has a configuration identical to that of light emitting device A except that light flux controlling member 300 is replaced by the light flux controlling member illustrated in FIG. 9.

With light emitting device A according to Embodiment 1 and light emitting device D for comparison, the variation of $\theta2$ with $\theta1$ changed from 0° to 75° was simulated. In each light emitting device, the parameters of the light flux controlling member were set as follows.

Figure 10B:
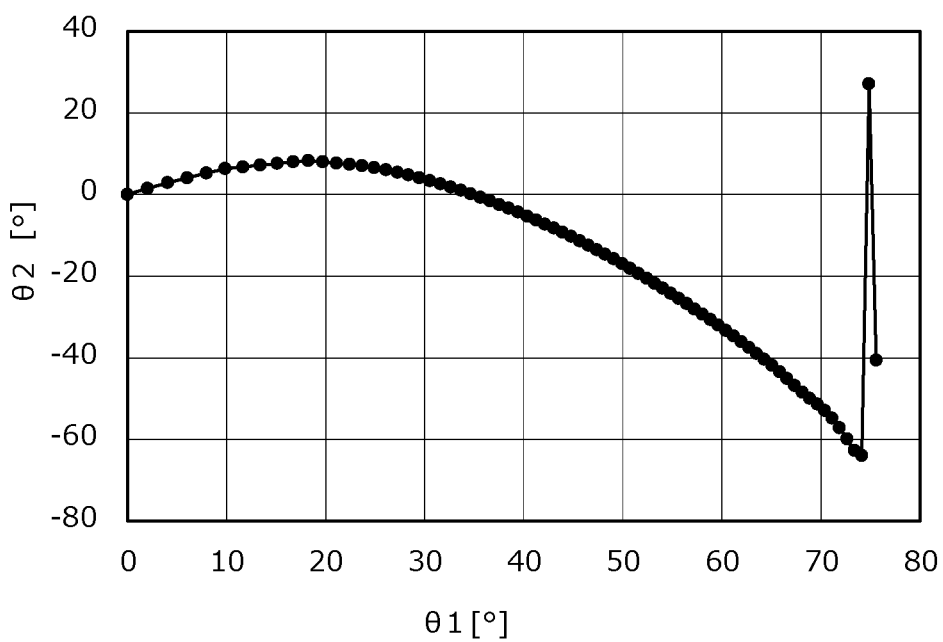

(Common Parameters)
Outer diameter of light flux controlling member: 15 mm
Outer diameter of emission surface: 14 mm
Opening diameter of recess: 3.5 mm
Height of light emitting element: 0.5 mm
Size of light emitting element: 2.5 mm×2.5 mm FIG. 10A shows a simulation result of light emitting device A according to Embodiment 1, and FIG. 10B shows a simulation result of light emitting device D for comparison.

The curve shown in FIG. 10B includes no inflection point. In particular, after $\theta1$ exceeds a region around 20°, the rate of change of $\theta2$ gradually increases as $\theta1$ increases. That is, it can be said that the rate of change of the inclination of the surface ranging from the highest point of second emission surface 18b to third emission surface 18c gradually increases as $\theta1$ increases (see FIG. 8).

In contrast, the curve shown in FIG. 10A includes an inflection point. In particular, in a region around the concave curve after the inflection point, the rate of change of $\theta2$ gradually decreases as $\theta1$ increases. That is, it can be said that the rate of change of the inclination of the surface ranging from the highest point of second emission surface 330b to third emission surface 330c gradually decreases as $\theta1$ increases (see FIG. 6D).

(2. Simulation of Light Distribution)

Light emitting device B according to Embodiment 2 has a configuration identical to that of light emitting device A of (1. Simulation of shape of emission surface of light flux controlling member) except that incidence surface 320, emission surface 330 and the surface of flange part 350 are mirror surfaces. Light emitting device C according to Embodiment 3 has a configuration identical to that of light emitting device A except that the height of rear surface 340 of light flux controlling member 300 from the light emission center (the gap between light flux controlling member 300 and light emitting element 220) is set to 0.2 mm. Further, for comparison, light emitting device E for comparison has a configuration identical to that of light emitting device D for comparison of (1. Simulation of shape of emission surface of light flux controlling member) except that emission surface 330 and the surface of flange part 350 are mirror surfaces, and that the height of the rear surface of the light flux controlling member from the light emission center is set to 0.2 mm.

The light distributions of light emitting devices A to E were simulated. First, a virtual hemisphere whose origin is the light emission center of light emitting element 220 of light emitting devices A to E was set. In a cross section including virtual optical axis LA passing through the origin of the hemisphere (orientation angle 0°), the luminous intensity was measured in a unit of 2° while moving the measuring apparatus along the peripheral surface of the virtual hemisphere such that the angle (polar angle) of the line connecting the measuring apparatus and the light emission center of light emitting element 220 with respect to optical axis LA is −90° to +90°. Further, the measurement was performed in the same manner also in a cross section orthogonal to the above-described cross section of the virtual hemisphere (orientation angle 90°). Then, the average value of the distribution of the orientation angle of 0° and the distribution of the orientation angle of 90° was obtained as the light distribution. The parameters of the light emitting element and the light flux controlling member in each light emitting device were identical to those of (1. Simulation of shape of emission surface of light flux controlling member). In addition, the radius of the virtual hemisphere was set to 1 m.

Figure 11A:
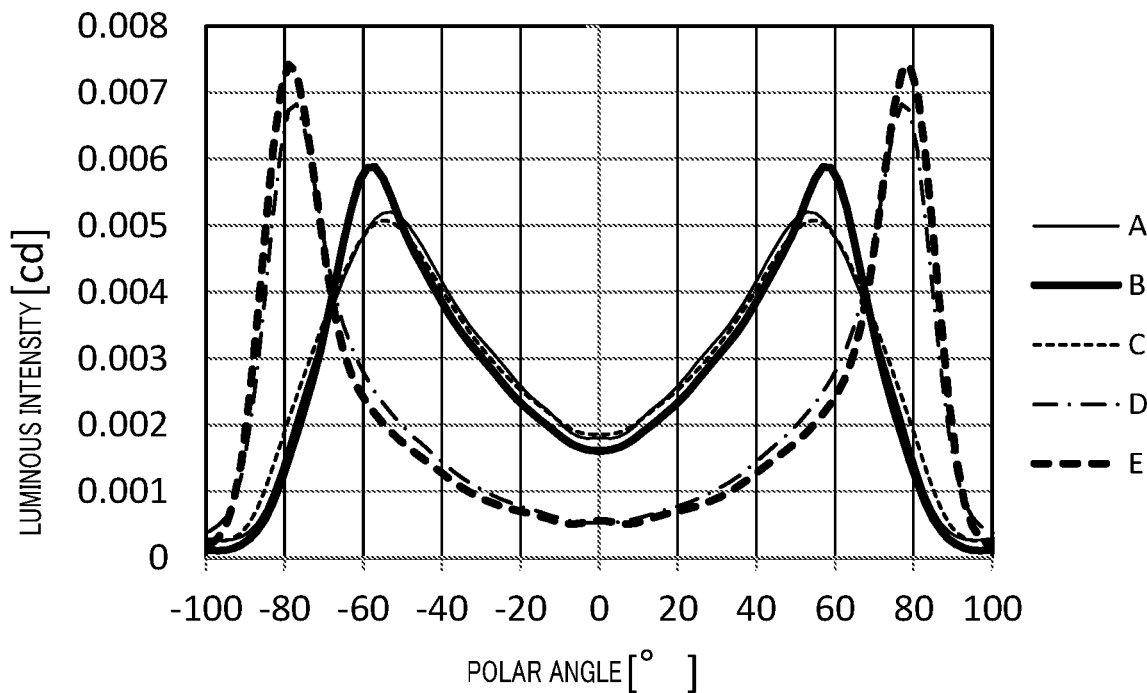
FIG. 11A and FIG. 11B show simulation results of light distributions in the light emitting device according to the embodiment and the light emitting device for comparison.
Figure 11B:
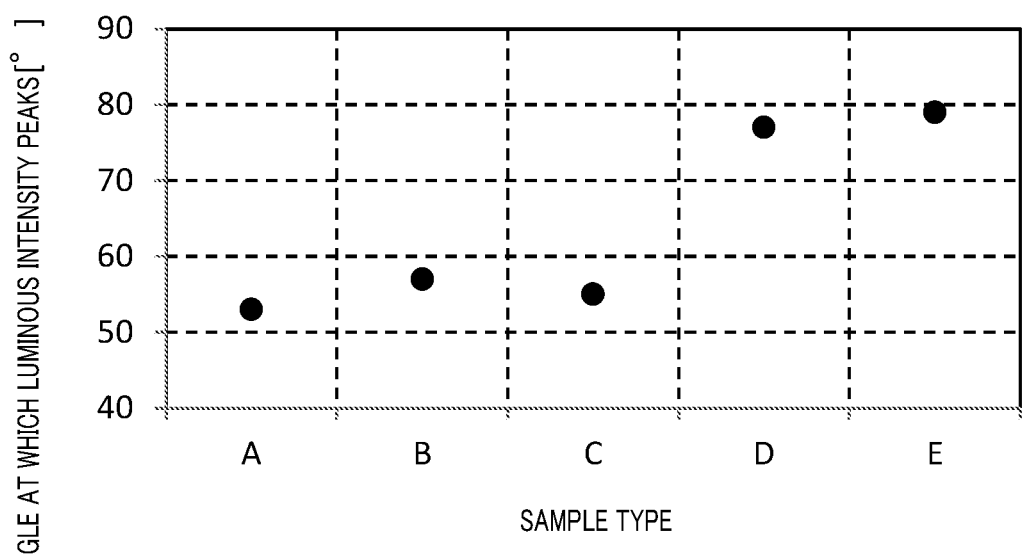

FIG. 11A is a graph showing light distributions. In FIG. 11A, the abscissa indicates polar angle (°), and the ordinate indicates luminous intensity (cd). FIG. 11B is a graph showing the polar angle at which the luminous intensity peaks in each sample. In FIG. 11B, the abscissa indicates the type of the sample, and the ordinate indicates the polar angle (°) at which the luminous intensity peaks.

It can be said from FIG. 11A that, in light emitting devices A to C according to Embodiments 1 to 3, the luminous intensity with the polar angle of 0° is high in comparison with light emitting devices D and E for comparison, and the polar angle at which the luminous intensity peaks is small in comparison with light emitting devices D and E for comparison. That is, it can be said that the luminous intensity peaks at a portion close to the horizontal direction (a region around −80° and 80°) in light emitting devices D and E for comparison, whereas the luminous intensity peaks at a portion close to the directly upward direction (a region around −60° or 60°) in light emitting devices A to C according to Embodiments 1 to 3, (see FIG. 11B). In addition, it can be said that, at a portion close to the horizontal direction (in a range of approximately −90° to −100° and a range of approximately 90° to 100°), the luminous intensities of light emitting devices A to C according to Embodiments 1 to 3 are low in comparison with the luminous intensities of light emitting devices D and E for comparison. That is, it can be said that, in light emitting devices A to C according to Embodiments 1 to 3, the light is easily spread in a region around optical axis LA of light emitting element 220 but not easily spread in a direction away from optical axis LA in comparison with light emitting devices D and E for comparison.

(3. Simulation of Light Beam Arrival Surface)

With the measurement results of light emitting device A according to Embodiment 1 and light emitting device D for comparison in (2. Simulation of light distribution), details of the surface of light flux controlling member on which light emitted from light emitting element 220 is incident were simulated. The parameters of the light emitting element and the light flux controlling member in each light emitting device were identical to those of (1. Simulation of shape of emission surface of light flux controlling member).

Figure 12A:
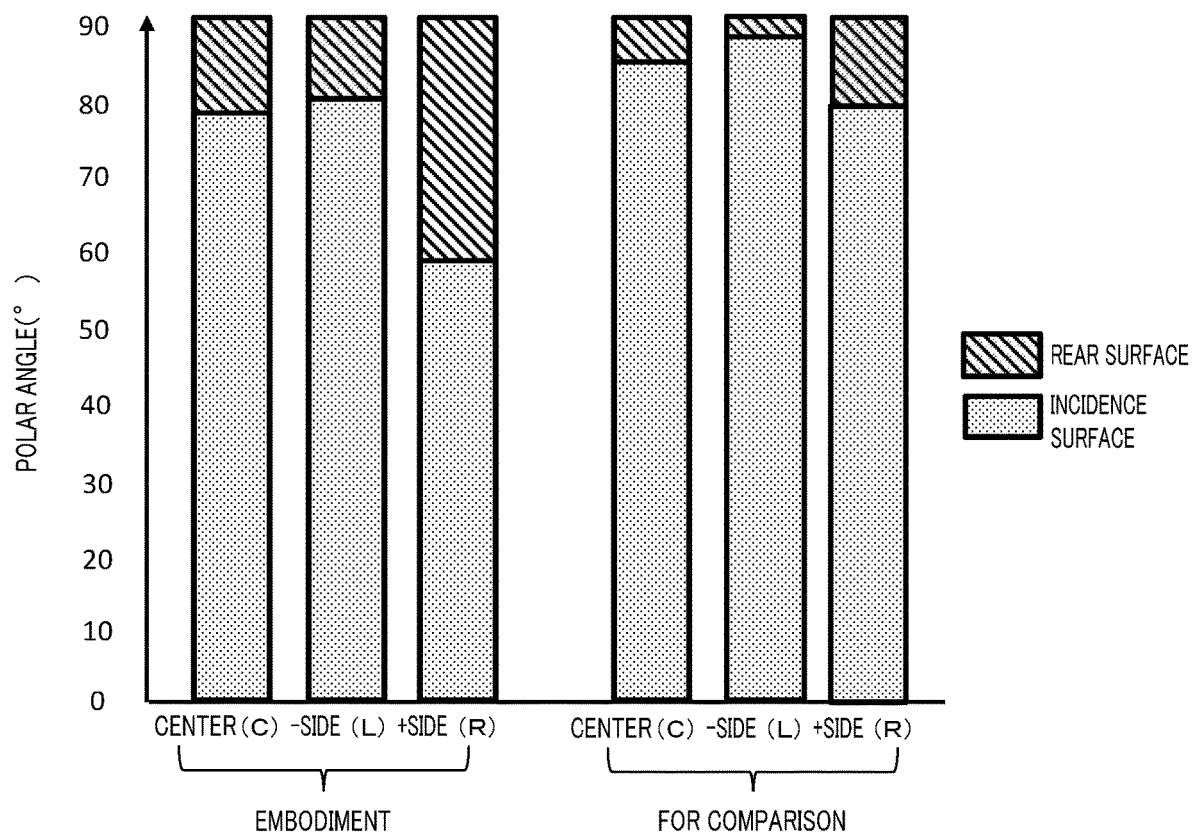
FIG. 12A and FIG. 12B show simulation results indicating details of the surface of the light flux controlling member on which light emitted from the light emitting element is incident in the case where the angle (polar angle) of light emitted from light emitting element with respect to the optical axis is varied in the light emitting device according to the embodiment and the light emitting device for comparison.
Figure 12B:
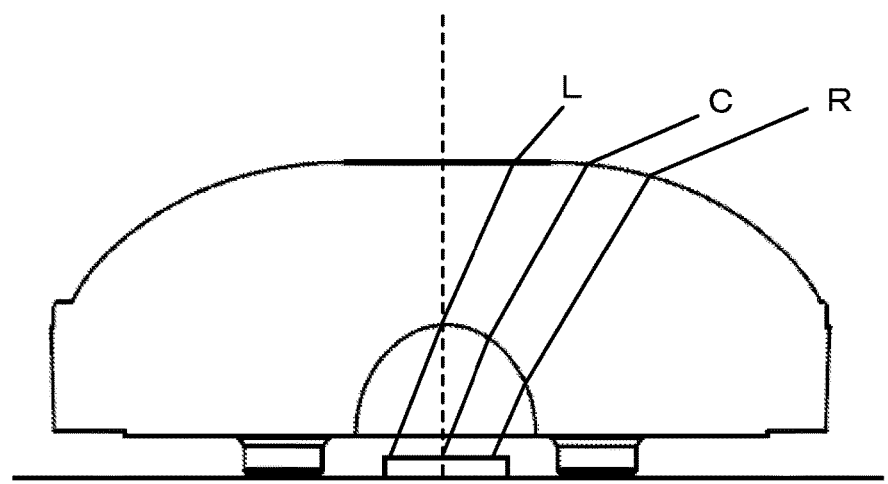
Figure 13:
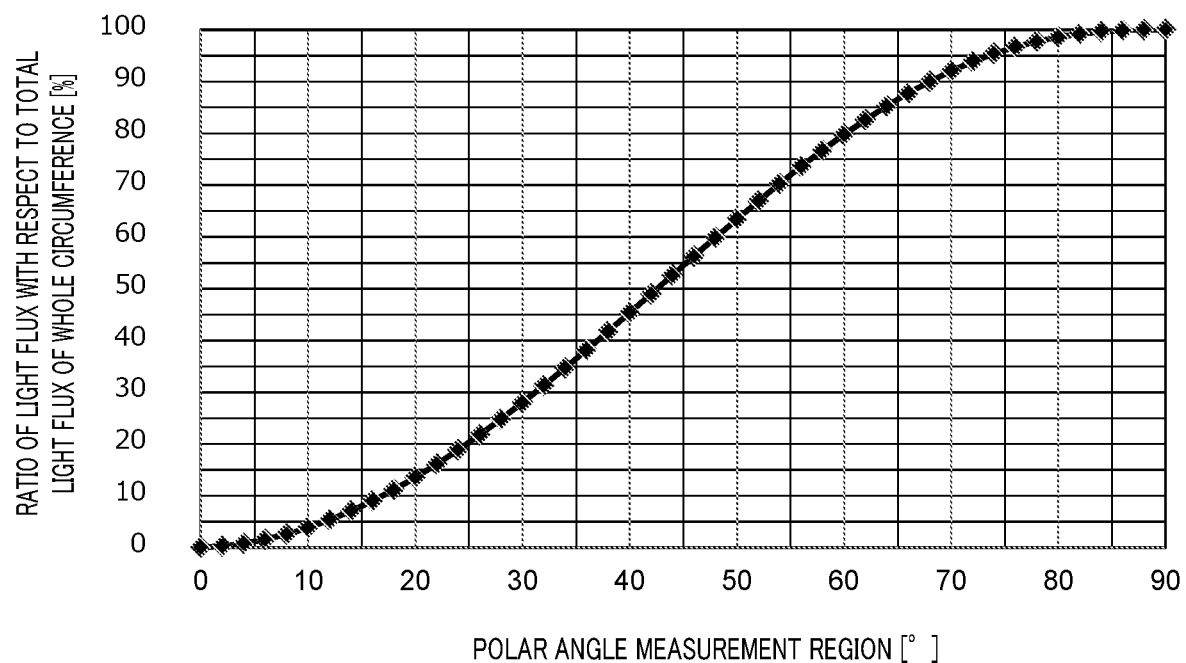
FIG. 13 shows simulation results of a ratio a light flux of each polar angle to a total light flux in the light emitting device according to the embodiment.

FIG. 12A shows calculation results which indicate details of the surface of the light flux controlling member on which the light emitted from light emitting element 220 is incident in the case where the angle (polar angle) of the light emitted from light emitting element 220 with respect to optical axis LA is varied. In FIG. 12A, the abscissa indicates an emission position of light emitted from the light emitting element, and the ordinate indicates an angle with respect to the optical axis, that is, a polar angle (°). In FIG. 12A, center (C) indicates light emitted from the light emission center of light emitting element 220, + side (R) indicates light emitted from an end portion of the light emitting surface on the plus side relative to the light emission center of light emitting element 220, and − side (L) indicates light emitted from an end portion of the light emitting surface on the minus side of the light emission center of light emitting element 220 (see FIG. 12B). FIG. 13 shows calculation results (graph) indicating a ratio of a light flux, of the light emitted from the light emitting element, emitted within a cone-shaped range between the light axis direction (0°) and a polar angle to the total light flux. In FIG. 13, the abscissa indicates a polar angle (°), and the ordinate indicates a ratio (integrated value)(%) of a light flux of each polar angle to the total light flux of the whole circumference.

It can be said from FIG. 12A that, in light emitting device A according to Embodiment 1, the proportion of light which is incident on the rear surface of the light flux controlling member (shaded area) is large in comparison with light emitting device D for comparison.

To be more specific, it can be said that, in light emitting device D for comparison, light of a polar angle equal to or greater than 0° and smaller than 86° is incident on the incidence surface of the light flux controlling member, and light of a polar angle of 86° to 90° is incident on the rear surface of the light flux controlling member (see center (C) of "for comparison" in FIG. 12A). In addition, it can be said from FIG. 13 that light of a polar angle equal to or greater than 0° and smaller than 86° corresponds to approximately 95% of the total light flux, and light of a polar angle of 86° to 90° corresponds to approximately 5% of the total light flux. In view of the foregoing, light corresponding to approximately 95% of the total light flux is incident on the incidence surface of the light flux controlling member, and light corresponding to approximately 5% of the total light flux is incident on the rear surface of the light flux controlling member.

In contrast, in light emitting device A of Embodiment 1, light of a polar angle equal to or greater than 0° and smaller than 77° is incident on the incidence surface of the light flux controlling member, and light of a polar angle of 77° to 90° is incident on the rear surface of the light flux controlling member (see center (C) of "embodiment" in FIG. 12A). In addition, it can be said from FIG. 13 that light of a polar angle equal to or greater than 0° and smaller than 77° corresponds to approximately 85% of the total light flux, and light of a polar angle of 77° to 90° corresponds to approximately 15% of the total light flux. In view of the foregoing, light corresponding to approximately 85% of the total light flux is incident on the incidence surface of the light flux controlling member, and light corresponding to approximately 15% of the total light flux is incident on the rear surface of the light flux controlling member.

(4. Simulation of Illuminance Distribution)

The following describes results of simulations of the illuminance distribution in a virtual region above the light emitting device (which corresponds to a light diffusion member of a surface light source device) in the case where light emitting devices A to C according to Embodiments 1 to 3 and light emitting devices D and E for comparison are disposed in (2. Simulation of light distribution).

The parameters of the light emitting element and the light flux controlling member in each light emitting device were identical to those of (1. Simulation of shape of emission surface of light flux controlling member). Further, the parameters of each light emitting device were set as follows.

(Common Parameters)

Distance from substrate surface to virtual region: 20 mm

Distance between centers of light emitting elements: 40 mm

Figure 14A:
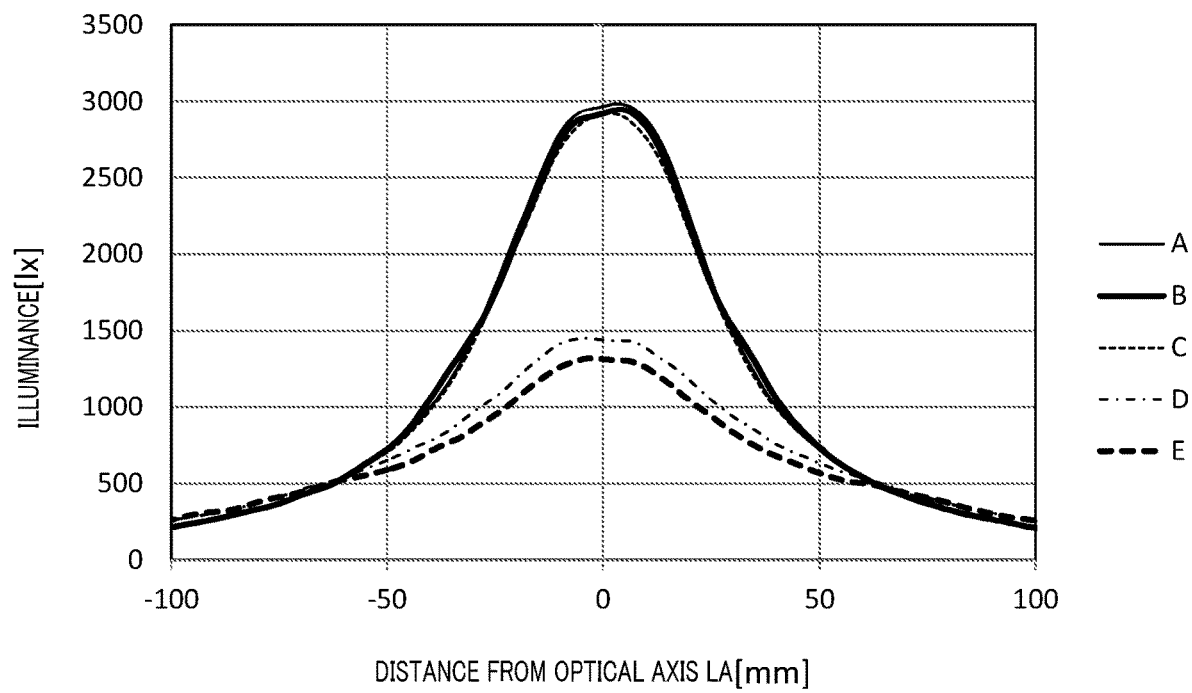
FIG. 14A and FIG. 14B show simulation results of illuminance distributions.
Figure 14B:
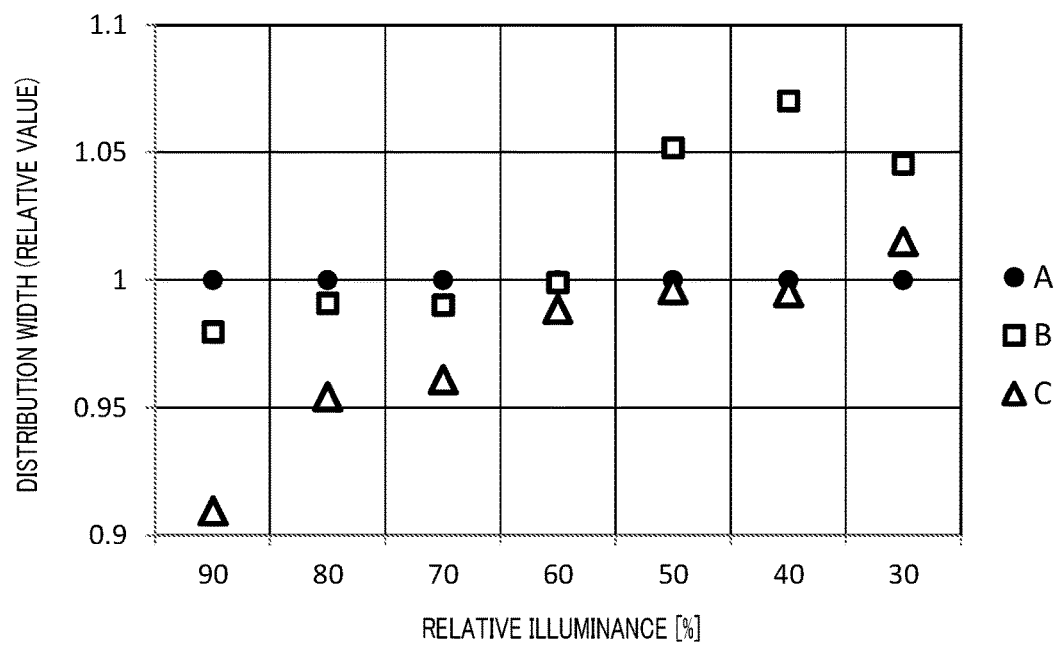

FIG. 14A shows simulation results of the illuminance distribution of light emitting devices A to C according to Embodiments 1 to 3 and light emitting devices D and E for comparison. FIG. 14B shows simulation results of the distribution width of light emitting devices B and C of each relative illuminance in which the distribution width of each relative illuminance of light emitting device A in FIG. 14A is set to 1. In FIG. 14A, the abscissa indicates the distance from optical axis LA in the horizontal direction (mm), and the ordinate indicates illuminance (lx). In FIG. 14B, the abscissa indicates a relative illuminance (%) in the case where the illuminance at optical axis LA is set to 100, and the ordinate indicates the distribution width of each relative illuminance of light emitting devices B and C with respect to the distribution width of each relative illuminance of light emitting device A.

It can be said from FIG. 14A that, in light emitting devices D and E for comparison, the illuminance of light emitting element 220 in a region around optical axis LA is low, and the illuminance distribution is broad. In contrast, it can be said that in light emitting devices A to C according to Embodiments 1 to 3, the illuminance of light emitting element 220 in a region around optical axis LA is high, and the illuminance distribution is sharp.

It can be said from FIG. 14B that in light emitting device A, the distribution width of the relative illuminance of 90 to 70% is wide, and the distribution width of the relative illuminance of 50 to 30% is narrow in comparison with light emitting devices B and C. That is, in light emitting device A, the illuminance in a region around optical axis LA is high, and the illuminance in a region remote from optical axis LA is low in comparison with light emitting devices B and C. Accordingly, among light emitting device A to C, light emitting device A is most preferable.

While rear surface 340 of light flux controlling member 300 has a prism shape in the present embodiment, the present invention is not limited to this, and rear surface 340 of light flux controlling member 300 may be a mirror surface which does not have a prism shape.

INDUSTRIAL APPLICABILITY

The light emitting device and the surface light source device according to the embodiment of the present invention are applicable to a backlight of a liquid crystal display apparatus and the like, for example.

REFERENCE SIGNS LIST

10 Light emitting device
3, 4, 14 Light flux controlling member
3A, 4A, 16 Incidence surface
3B, 4B, 18 Emission surface
18a First emission surface
18b Second emission surface
18c Third emission surface
20 Rear surface
22 Flange part
100 Surface light source device
110 Casing
112 Bottom plate
114 Top plate
120 Light diffusion member
200 Light emitting device
210 Substrate
220 Light emitting element
300 Light flux controlling member
310 Recess
320 Incidence surface
330 Emission surface
330a First emission surface
330b Second emission surface
330c Third emission surface
340 Rear surface
350 Flange part
360 Leg part
CA Central axis of light flux controlling member
LA Optical axis of light emitting element

The invention claimed is:

1. A light emitting device comprising:
   a light emitting element; and
   a light flux controlling member configured to control a distribution of light emitted from the light emitting element, wherein:
   the light flux controlling member includes:
      an incidence surface composed of an internal surface of a recess formed on a rear side of the light flux controlling member to intersect a central axis of the light flux controlling member, the incidence surface being configured to allow incidence of the light emitted from the light emitting element,
      an emission surface formed on a front side of the light flux controlling member to intersect the central axis, and configured to emit light incident on the incidence surface to outside of the light flux controlling member, and
      a rear surface formed on the rear side of the light flux controlling member and extended in a radial direction from an opening edge part of the recess, the radial direction being a direction perpendicular to the central axis,
   the light flux controlling member is disposed such that, in a cross section of the light emitting device including an optical axis of the light emitting element, light emitted at a minimum θ1=81° from a light emission center of the light emitting element is incident directly on the rear surface of the light flux controlling member from outside to enter the light flux controlling member, wherein θ1 is an angle of the light emitted from the light emission center as a base point with respect to the optical axis, the central axis of the light flux controlling member and the optical axis coinciding with each other, and the emission surface is formed such that, in the cross section of the light emitting device including the optical axis of the light emitting element, a curve of a graph with an abscissa of θ1 and an ordinate of θ2 includes an inflection point, wherein the graph is obtained by plotting θ2 with respect to θ1 when θ1 is changed from 0° to 90°, θ2 being an angle between a line orthogonal to the optical axis and a tangent to the emission surface at a point P, the point P being an arrival point on the emission surface of light emitted from the light emission center of the light emitting element at angle θ1 with respect to the optical axis, a point of the emission surface corresponding to the inflection point existing between an outermost edge of the emission surface and the highest point of the emission surface.

2. The light emitting device according to claim 1 wherein the emission surface includes:
a first emission surface including a concave curved surface disposed at a position to intersect the optical axis,
a second emission surface including a convex curved surface disposed at a periphery of the first emission surface, and
a third emission surface including a curved surface disposed at a periphery of the second emission surface.

3. The light emitting device according to claim 1 wherein at least one of the incidence surface or the emission surface is a rough surface.

4. The light emitting device according to claim 2 wherein at least one of the incidence surface or the emission surface is a rough surface.

5. The light emitting device according to claim 1 wherein:
the light flux controlling member further includes a flange part provided between an outer periphery part of the emission surface and an outer periphery part of the rear surface; and
a surface of the flange part is a rough surface.

6. The light emitting device according to claim 2 wherein:
the light flux controlling member further includes a flange part provided between an outer periphery part of the emission surface and an outer periphery part of the rear surface; and
a surface of the flange part is a rough surface.

7. The light emitting device according to claim 3 wherein:
the light flux controlling member further includes a flange part provided between an outer periphery part of the emission surface and an outer periphery part of the rear surface; and
a surface of the flange part is a rough surface.

8. The light emitting device according to claim 4 wherein:
the light flux controlling member further includes a flange part provided between an outer periphery part of the emission surface and an outer periphery part of the rear surface; and
a surface of the flange part is a rough surface.

9. A surface light source device comprising:
the light emitting device according to claim 1; and
a light diffusion member configured to allow light from the light emitting device to pass therethrough while diffusing the light.

10. A surface light source device comprising:
the light emitting device according to claim 2; and
a light diffusion member configured to allow light from the light emitting device to pass therethrough while diffusing the light.

11. A surface light source device comprising:
the light emitting device according to claim 3; and
a light diffusion member configured to allow light from the light emitting device to pass therethrough while diffusing the light.

12. A surface light source device comprising:
the light emitting device according to claim 4; and
a light diffusion member configured to allow light from the light emitting device to pass therethrough while diffusing the light.

13. A surface light source device comprising:
the light emitting device according to claim 5; and
a light diffusion member configured to allow light from the light emitting device to pass therethrough while diffusing the light.

14. A surface light source device comprising:
the light emitting device according to claim 6; and
a light diffusion member configured to allow light from the light emitting device to pass therethrough while diffusing the light.

15. A surface light source device comprising:
the light emitting device according to claim 7; and
a light diffusion member configured to allow light from the light emitting device to pass therethrough while diffusing the light.

16. A surface light source device comprising:
the light emitting device according to claim 8; and
a light diffusion member configured to allow light from the light emitting device to pass therethrough while diffusing the light.

* * * * *